(12) United States Patent
Sorrentino

(10) Patent No.: US 7,486,662 B2
(45) Date of Patent: Feb. 3, 2009

(54) METHOD AND SYSTEM OF MANAGING CONNECTIONS BETWEEN CIRCUIT-SWITCHED AND PACKET-SWITCHED NETWORKS

(75) Inventor: Bob Sorrentino, Middletown, NJ (US)

(73) Assignee: Arbinet-thexchange, Inc., New Brunswick, NJ (US)

( * ) Notice: Subject to any disclaimer, the term of this patent is extended or adjusted under 35 U.S.C. 154(b) by 1107 days.

(21) Appl. No.: 10/745,318

(22) Filed: Dec. 22, 2003

(65) Prior Publication Data

US 2004/0146049 A1 Jul. 29, 2004

Related U.S. Application Data

(63) Continuation of application No. 09/952,352, filed on Sep. 12, 2001, now Pat. No. 6,757,275.

(60) Provisional application No. 60/231,645, filed on Sep. 11, 2000.

(51) Int. Cl.
*H04L 12/66* (2006.01)
(52) U.S. Cl. ................................ 370/352; 370/356
(58) Field of Classification Search ................ 370/351, 370/352, 353, 354, 355, 356
See application file for complete search history.

(56) References Cited

U.S. PATENT DOCUMENTS

| | | | |
|---|---|---|---|
| 4,608,685 A | 8/1986 | Jain et al. | |
| 5,093,827 A | 3/1992 | Franklin et al. | |
| 5,781,547 A | 7/1998 | Wilson | |
| 6,005,926 A | 12/1999 | Mashinsky | 379/114 |
| 6,243,373 B1 | 6/2001 | Turock | |
| 6,282,192 B1 * | 8/2001 | Murphy et al. | 370/352 |
| 6,477,164 B1 * | 11/2002 | Vargo et al. | 370/356 |
| 6,628,652 B1 | 9/2003 | Chrin et al. | |
| 6,657,989 B1 | 12/2003 | Hilsenrath | |
| 6,791,988 B1 | 9/2004 | Hameleers et al. | |

(Continued)

FOREIGN PATENT DOCUMENTS

WO   WO 00/51395   8/2000

OTHER PUBLICATIONS

"Packet Routing Algorithms For Integrated Switching Networks", Reed et al. Department of Computer Science University of Illinois Urbana, Illinois 61801 pp. 7-15 (1987).

(Continued)

*Primary Examiner*—Ajit Patel
(74) *Attorney, Agent, or Firm*—Cohen Pontani Lieberman & Pavane LLP

(57) ABSTRACT

A system for transmitting telecommunications traffic for one or more customers between packet-switched and circuit switched networks generates a routing table for routing the telecommunications traffic. The routing table includes one or more routes specified for each customer, each of the routes being identified with a customer identifier. The system associates identifying information of each packet-switched network with a customer identifier and receives from a packet-switched network telecommunications traffic including information identifying the packet-switched network. The system also identifies the customer identifier associated with the packet-switched network identifying information and selects by the network switch one of the plurality of circuit-switched networks for receiving the telecommunications traffic based on the routing table and the identified customer identifier.

18 Claims, 12 Drawing Sheets

Our partner's Gateway originates a VOIP call destined for the platform by including originating IP, destination IP and DNIS.

U.S. PATENT DOCUMENTS

| | | | |
|---|---|---|---|
| 6,798,766 B1 * | 9/2004 | Bevan et al. | 370/352 |
| 7,123,608 B1 * | 10/2006 | Scott et al. | 370/353 |
| 7,209,473 B1 * | 4/2007 | Mohaban et al. | 370/352 |
| 7,286,521 B1 * | 10/2007 | Jackson et al. | 370/352 |
| 2002/0097708 A1 * | 7/2002 | Deng | 370/352 |
| 2002/0176403 A1 * | 11/2002 | Radian | 370/352 |
| 2003/0123438 A1 * | 7/2003 | Li et al. | 370/356 |
| 2005/0232222 A1 * | 10/2005 | McConnell et al. | 370/349 |
| 2008/0013531 A1 * | 1/2008 | Elliott et al. | 370/356 |

OTHER PUBLICATIONS

"Routing as a Flow Control Strategy in an Integrated Circuit/Packet Switched Communications Network", Hebert et al. Department of Computer Science Texas A & M University pp. 786-794 (1986).

"A Performance Monitoring System For VOLP Gateways", Adrain E. Conway Infolibria, Inc. 411 Waverly Oaks Road Waltham, MA 02452 pp. 38-43 (2000).

* cited by examiner

Partners' Physical Networks

Identifying Logical Domains or Zones

Grouping our Partners' Network Elements into logical Domains

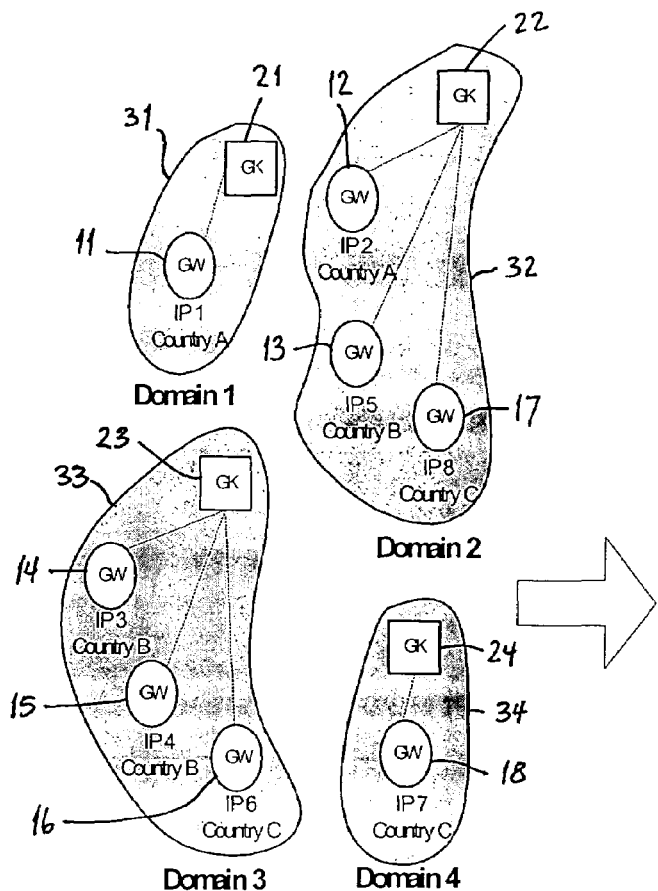

| Domain Configuration Table |||
|---|---|---|
| Domain | IP | Country |
| Domain1 | IP1 | CountryA |
| Domain2 | IP2 | CountryA |
| Domain2 | IP5 | CountryB |
| Domain2 | IP8 | CountryC |
| Domain3 | IP3 | CountryB |
| Domain3 | IP4 | CountryB |
| Domain3 | IP6 | CountryC |
| Domain4 | IP7 | CountryC |

| Domain Identification Table |||
|---|---|---|
| Domain | Prefix | ANI |
| Domain1 | xxx1 | xxx1 |
| Domain2 | xxx2 | xxx2 |
| Domain3 | xxx3 | xxx3 |
| Domain4 | xxx4 | xxx4 |

Figure 4

Defining look-up tables to correctly identify each network element. The *Domain Configuration Table* groups each gateway into a specific domain. The *Domain Identification Table* assigns a unique 4-digit identifier to each domain.

A Partner in Country B wishes to place a call to Country X

Exchange of authentication and routing information between gateways and gatekeepers and between domains Our partner's Gateway originates a VOIP call destined for the platform by including originating IP, destination IP and DNIS.

The platform's gateway launches an ISDN call by prefixing the DNIS with a unique 4-digit customer ID. The switch generates a CDR record, strips the prefix and selects the best route based the partner's identity.

Call from Country X to Country B is routed via an IP network based on price, quality and ASR.

The platform's switch pre-fixes a unique 4-digit identifier to the DNIS and sends the call to the VOIP gateway.

The platform receives an ISDN call and queries the gatekeeper for authorization and routing information.

The Platform's Gateway originates a VOIP call destined for partner's network by including originating IP, destination IP and DNIS.

METHOD AND SYSTEM OF MANAGING CONNECTIONS BETWEEN CIRCUIT-SWITCHED AND PACKET-SWITCHED NETWORKS

RELATED APPLICATIONS

This application is a Continuation of U.S. patent application Ser. No. 09/952,352 filed Sep. 12, 2001 now U.S. Pat. No. 6,757,275. Priority is claimed from that application and from U.S. Provisional Patent Application Ser. No. 60/231,645 which was filed on Sep. 11, 2000.

BACKGROUND OF THE INVENTION

1. Field of the Invention

The present invention relates to telecommunications and, more particularly, to the management of connections between a packet-switched network and a circuit-switched network.

2. Description of the Related Art

Increasingly, telecommunications traffic, including voice calls, is being routed over packet-switched networks such as an Internet Protocol (IP) networks, Asynchronous Transfer Mode (ATM) based networks, or Frame Relay network to reduce transmission costs. This form of telecommunications service is known as packet telephony. Packet telephony uses the more efficient packet-switching technology instead of circuit-switching technology to support calls, especially long-distance calls, to achieve cost savings.

To route calls between a circuit-switched network and a packet-switched network, a Voice Over Internet Protocol (VOIP) service provider needs to enter into separate bilateral agreements with various Public Switched Telecommunications Network (PSTN) carriers. Separate gateways and dedicated ports at a network switch of a PSTN carrier are required to terminate the telecommunications traffic from the VOIP service provider. Accordingly, a VOIP service provider must negotiate a great number of these bilateral agreements to terminate traffic worldwide. Such bilateral arrangements are time-consuming and inefficient as these transaction costs reduce the profit margins of the VOIP service providers.

To increase transaction efficiency, VOIP service providers have begun to make use of a central hub for routing calls to and from one or more circuit-switched networks. However, since the packet-switched networks and circuit-switched networks use different protocols, it is difficult if not impossible to provide detailed call records for accounting and routing purposes.

SUMMARY OF THE INVENTION

An object of the present invention is to provide a method of managing connections between packet-switched networks and circuit-switched networks.

According to one aspect of the invention, calls from one customer are routed to a predesignated network of another customer according to a routing table.

According to another embodiment of the invention, the customer is identified for purposes such as billing.

According to one embodiment of the present invention, a system is provided for transmitting telecommunications traffic between packet-switched networks and circuit-switched networks. The system generates a routing table for routing telecommunications traffic for one or more customers. The routing table includes one or more routes specified for each customer, each of the routes being associated with a customer identifier. The system associates identifying information of each packet-switched network with a customer identifier and receives from a packet-switched network telecommunications traffic including information identifying the packet-switched network. The system also identifies the customer identifier associated with the packet-switched network identifying information and selects by the network switch one of the plurality of circuit-switched networks for receiving the telecommunications traffic based on the routing table and the identified customer identifier.

In another embodiment, the present invention provides a method of transmitting telecommunications traffic between packet-switched networks and circuit-switched networks. The method comprises the steps of generating a routing table for routing telecommunications traffic for one or more customers. The routing table includes one or more routes specified for each customer, each of the routes being associated with a customer identifier. The method also includes the steps of associating each packet-switched network with a customer identifier and receiving by a network switch from a circuit-switched network telecommunications traffic including a customer identifier. The method then identifies the packet-switched network associated with the customer identifier included in the telecommunications traffic from the network switch. The telecommunications traffic is converted into a format compatible with the selected packet-switched network prior to its transmission through the network.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

In the drawings, wherein like reference characters denote similar elements throughout the several views:

FIG. 4 diagrammatically illustrates look-up tables listing unique identifiers for the domains;

DETAILED DESCRIPTION OF THE PRESENTLY PREFERRED EMBODIMENTS

We have developed a web-based trading system that allows our members or users to exchange telecommunications traffic with one another and that interacts directly with a telecommunications switch by updating its routing table. The trading system is disclosed in U.S. Pat. No. 6,005,926, the entire contents of which is incorporated herein by reference. The architecture of the trading system requires a platform to properly identify the originating and terminating partner's gateways and that all traffic be routed through the telecommunications switch—Voice Over Internet Protocol (VOIP) included.

In accordance with the present invention, the platform may include a gatekeeper, a gateway, and a telecommunications switch, the operations of which are described in more details below. The platform preferably performs the following tasks:

1) Inbound VOIP Traffic:

The platform dynamically identifies each inbound VOIP call destined for a Public Switched Telecommunication Network (PSTN) by adding a unique prefix to the Dialed Number Identification Service (DNIS) and/or inserting a unique Automatic Number Identifier (ANI) on the originating gateway's IP network or domain (the domain will be described in detail below). Each call will be identified based on a user configurable lookup table and will be "tagged" with the customer's unique identifier—e.g., the prefix ID or ANI.

2) Outbound VOIP Traffic:

The platform dynamically routes each outbound VOIP call originated from a PSTN network to a destination gateway by identifying the prefix preceding the DNIS and/or by detecting an ANI based on a user configurable routing table. The platform preferably strips the prefix and passes the correct DNIS to the destination gateway.

Domain Configuration

Figure 1:
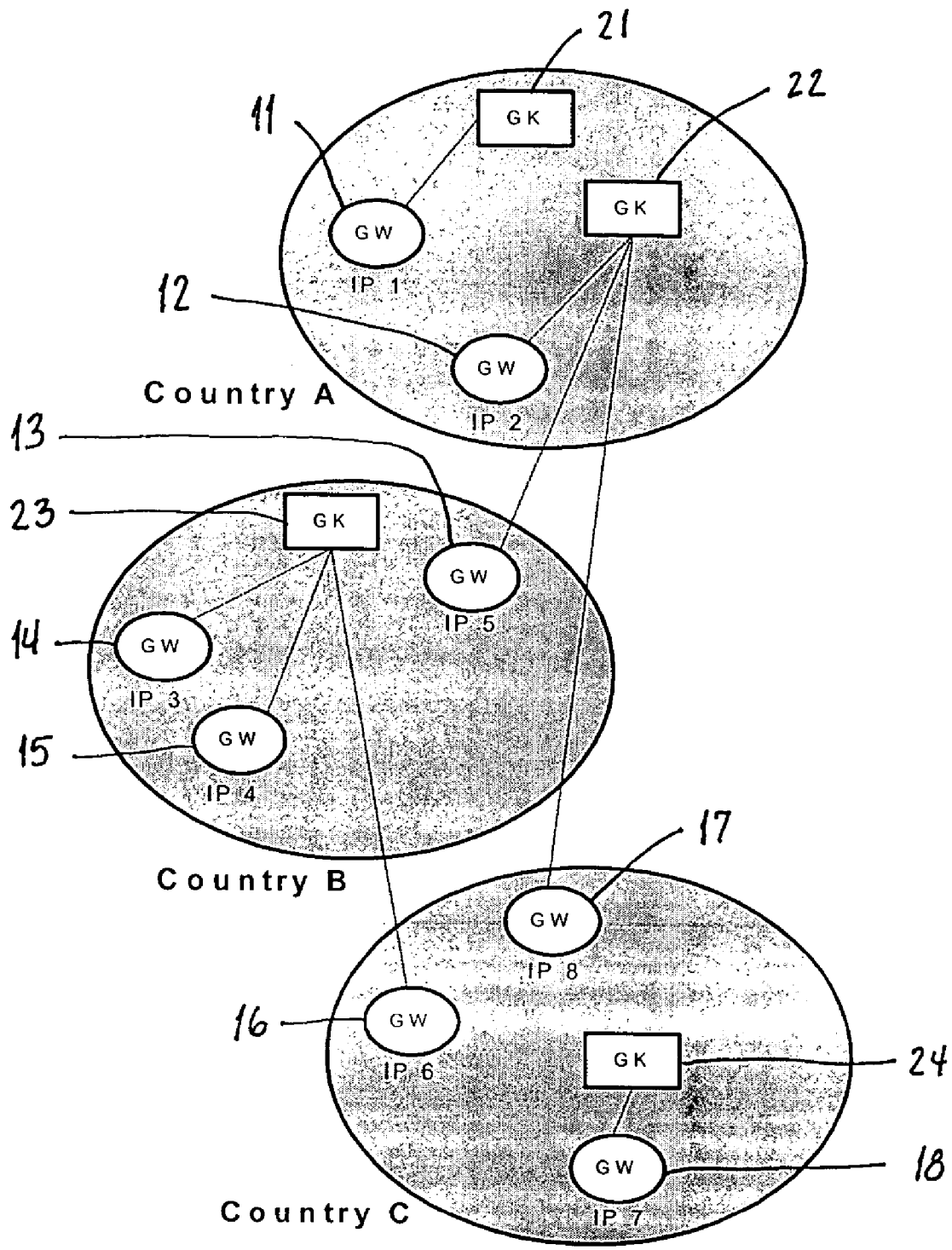
FIG. 1 diagrammatically illustrates a plurality of Voice Over Internet Protocol (VOIP) networks.

The VOIP network of each of the partners may comprise of a number of gateways distributed across several geographical regions or countries. FIG. 1 shows a hypothetical example where a trading system exchanges VOIP traffic with several partners covering several countries, for example: Country A, Country B and Country C. Gateways 11-18 and gatekeepers 21-24 are dispersed throughout the countries A, B, and C.

In the hypothetical example, domain 31 is a small carrier which includes one gateway 11 and one gatekeeper 21 and domain 32 is larger carrier having many redundant gateways 12, 13, 17 and gatekeeper 22. However, the domain may be even larger covering many geographical regions including different countries and may contain many more gateways and more than one gatekeeper.

Figure 2:
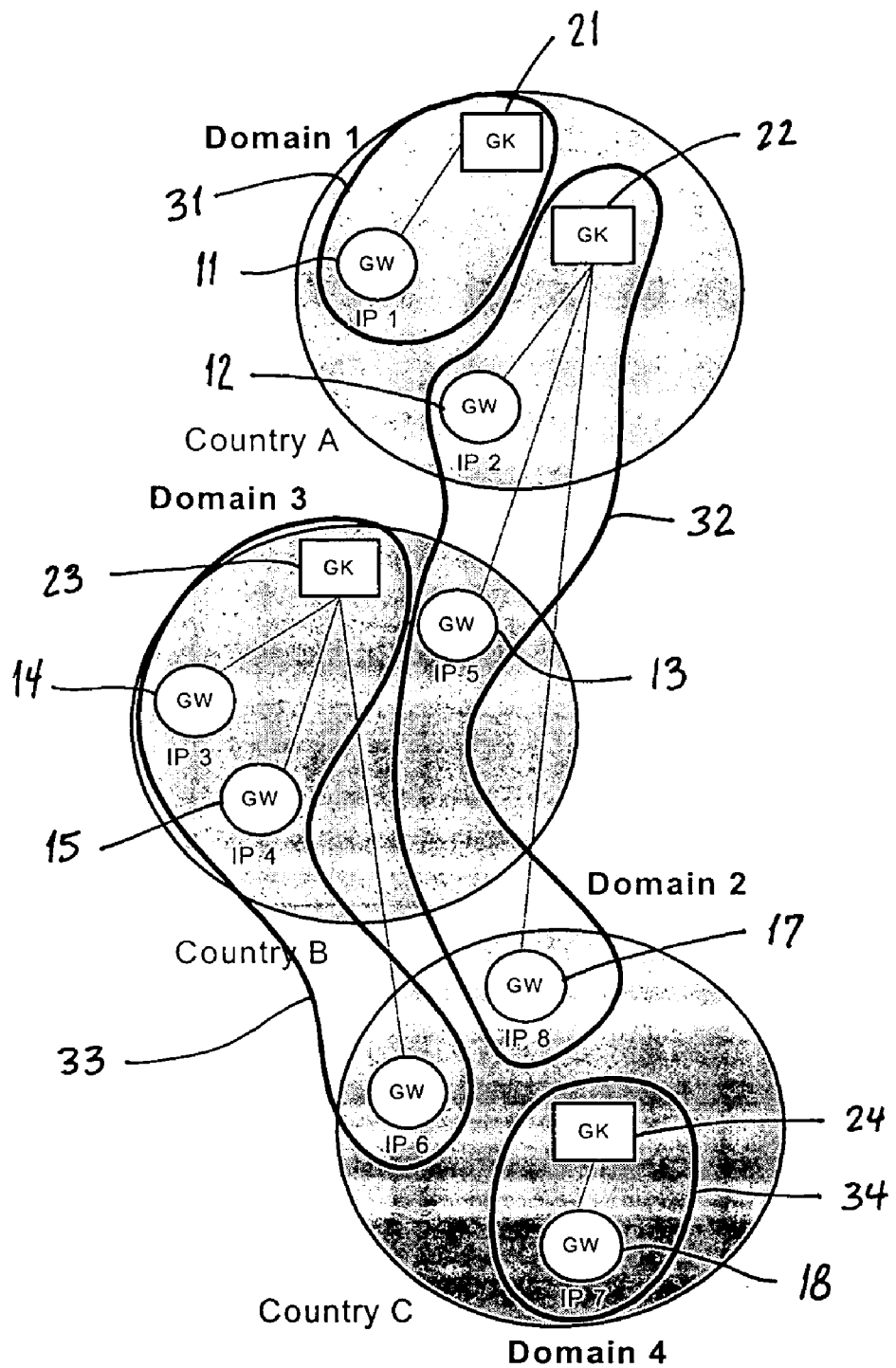
FIG. 2 diagrammatically illustrates grouping of VOIP networks into logical domains or zones.

Regardless of size, the networks could be organized into independent logical groups called zones or domains 31, 32, 33, 34 (see FIG. 2). Each domain 31, 32, 33, 34 in effect identifies a unique partner regardless of how many VOIP elements they possess or where they are located.

FIG. 2 shows how the networks could be organized into four logical domains 31, 32, 33, 34 regardless of country boundaries or network size.

Once all gateways 11-18 and gatekeepers 21-24 have been grouped within a domain, we can treat them as a cluster of elements belonging to a specific partner and identified by their unique domain name.

Figure 3:
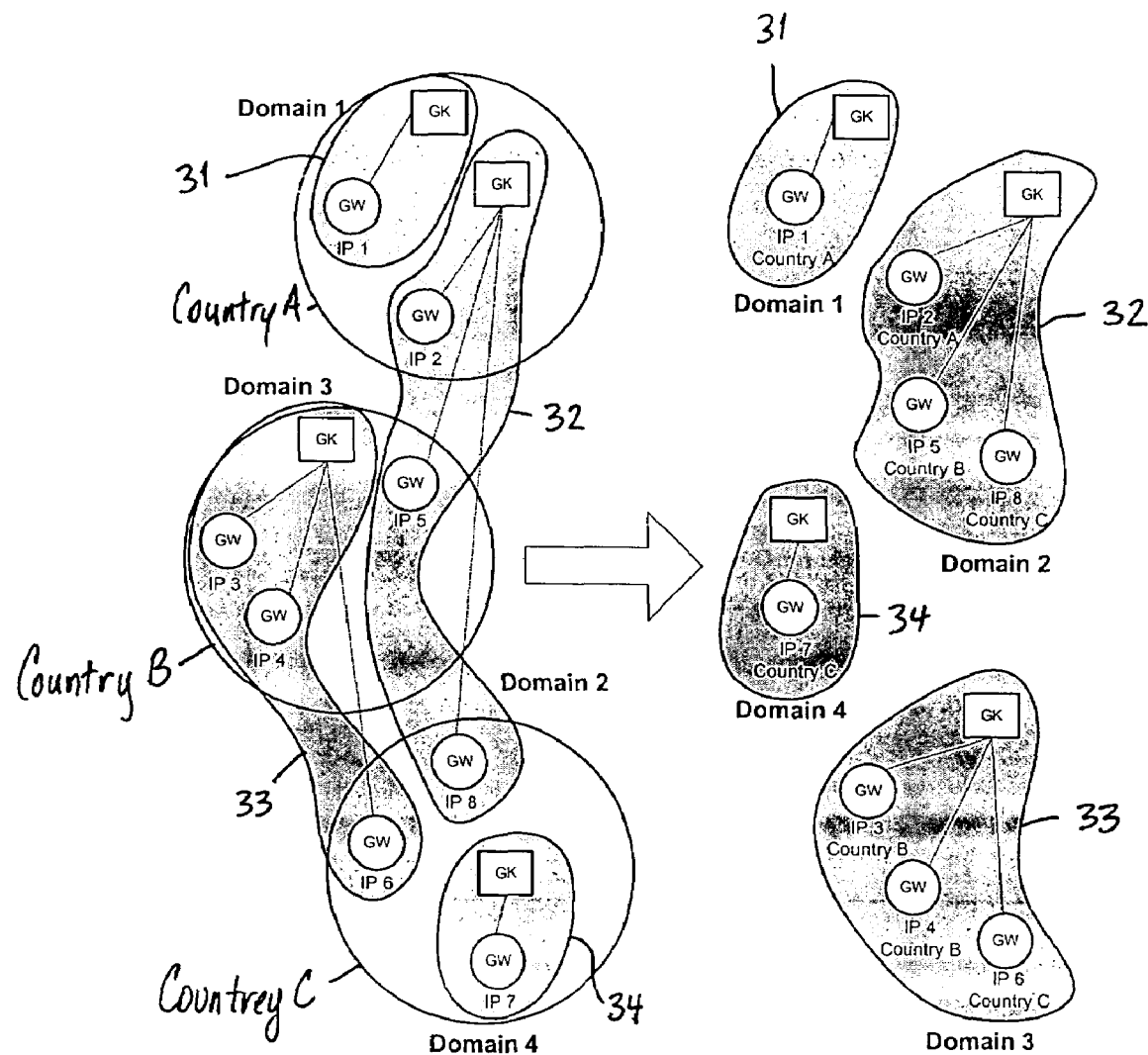
FIG. 3 diagrammatically illustrates grouping of networks into four domains.

FIG. 3 shows how all the network elements in the partners' networks have been grouped into four domains 31-34 which are labeled Domain1, Domain2, Domain3, Domain4. Note also that once a gateway is assigned to a specific Domain, the country code (or city code) that a specific gateway serves should be recorded.

Inbound Traffic

As shown in the embodiment of FIG. 4, we have "mapped" the partners' networks into two user-defined look-up tables: the Domain Configuration Table which groups each gateway 11-18 in our partners' networks into a specific domain, and the Domain Identification Table which assigns a unique 4-digit identifier to each domain 31, 32, 33, 34 which in effect assigns a unique identifier to every partner.

Once we have organized the partners' networks into domains, we can configure a gateway 51 and gatekeeper 52 of a platform 50 to properly identify incoming VOIP traffic.

Figure 5:
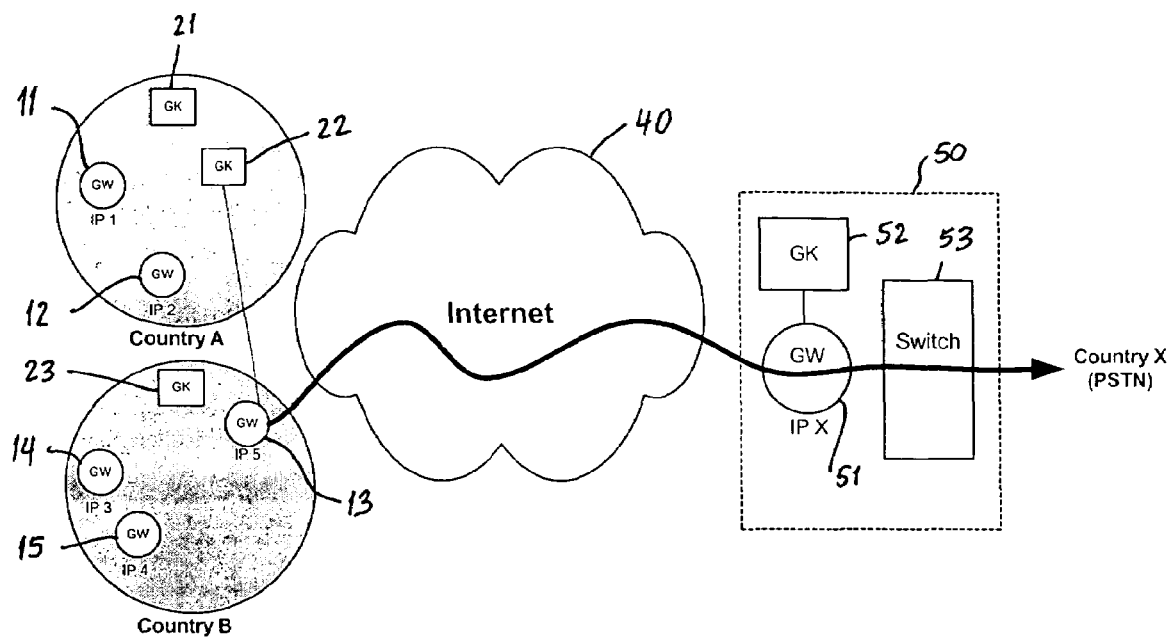
FIG. 5 diagrammatically illustrates a VOIP call placed through a platform according to the present invention.

The following example highlights the steps that should occur in order for the VOIP platform to properly identify incoming calls according to the present invention. In FIG. 5, a customer served by a gateway 13 in Country B (with IP5) wants to place a call to a friend in count X.

Figure 6:
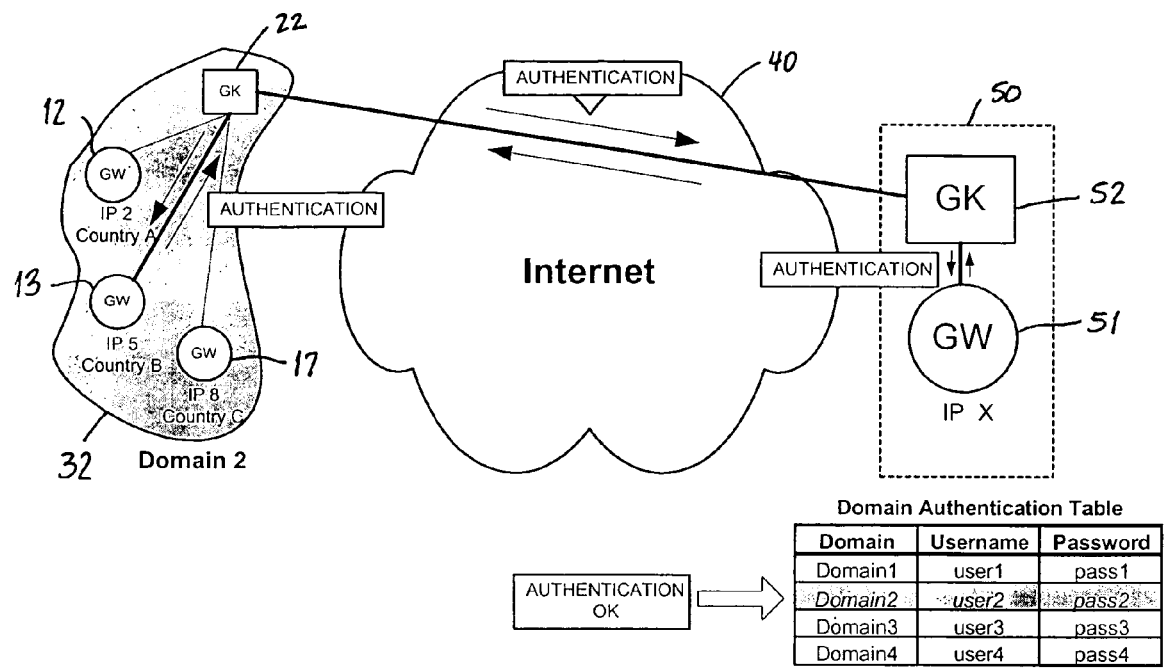
FIG. 6 diagrammatically illustrates an exchange of authentication information between the platform and a VOIP network.

The first step is to exchange authentication information between the two network domains. The serving gateway 13 in Country B (with IP5) queries its gatekeeper 22 for a route (destination gateway) in order to originate a VOIP call. The originating gatekeeper 22 sends its username (or domain name) and password to the platform 50 via the Internet 40. requesting authorization to terminate a VOIP call. The platform 50 receives the username (or domain name) and password and validates it against a pre-established Domain Authorization Table. If the information is valid, the platform 50 replies with an acknowledgement and authorizes the call (See FIG. 6).

Figure 7:
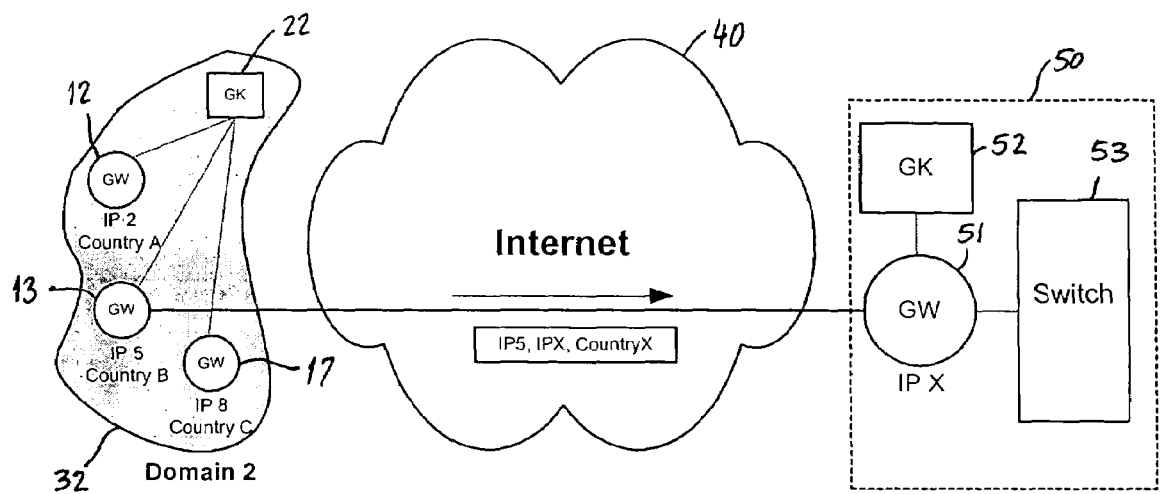
FIG. 7 diagrammatically illustrates the transmission of a VOIP call from a VOIP network to the platform.

FIG. 7 shows that once authorization has been granted, the serving gateway 13 originates a VOIP call by sending the DNIS (called number) to the platform 50 via the Internet 40 and includes the originating IP (it's own IP in this case IP5) and the destination IP (the platform's Gateway IP, in this case IPX) as well.

Figure 8:
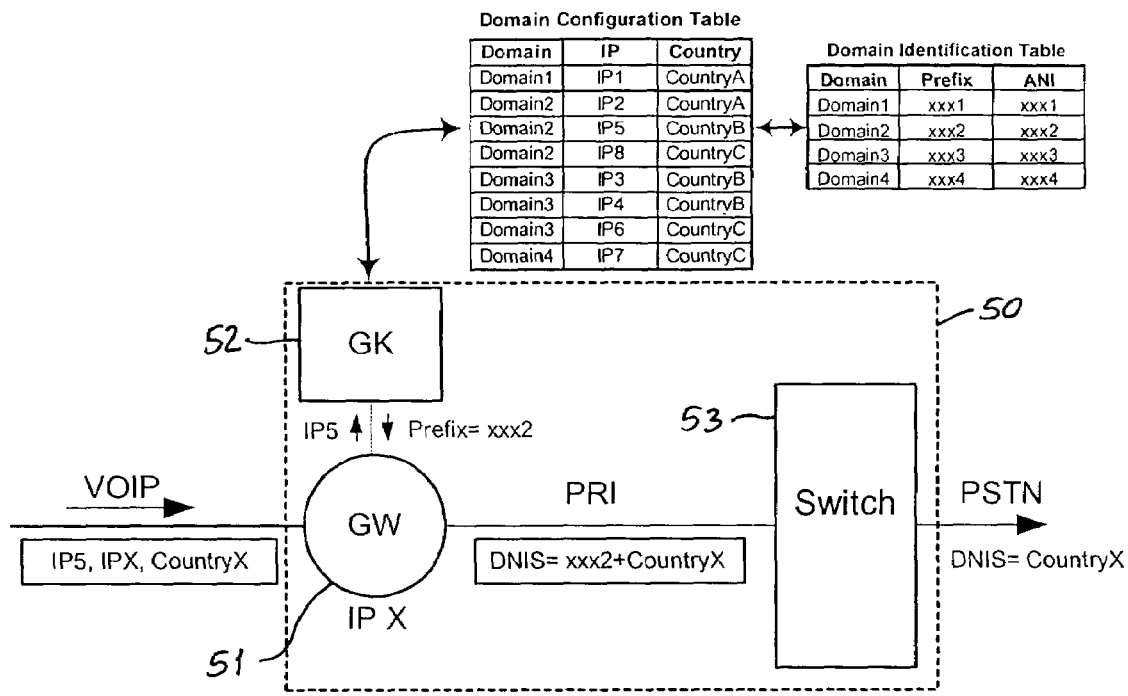
FIG. 8 diagrammatically illustrates the transmission of the VOIP call from the platform to a Public Switched Telecommunication Network (PSTN)

FIG. 8 is an exemplary illustration of a call identification procedure according to the invention. As shown, once the platform's gateway 51 receives the VOIP call, it checks with the gatekeeper 52 for proper call identification. The gatekeeper 52 checks in the Domain Configuration Table and Domain Identification Table and replies to the gateway 51 with the correct 4-digit prefix—in this case xxx2 for Domain2 (the ID is assigned based on the originating gateway's IP and its Domain). The gateway 51 prefixes the DNIS with the unique 4-digit customer's identification ED and launches a PSTN call—in this case an ISDN call.

Finally, the platform's telecommunications switch 53 detects the prefix, generates a Call Data Record (CDR) and selects the best PSTN route based on the caller's identity (or routing table), strips the prefix and routes the call to the destination country—Country X in our example.

Note that the concept of DNIS prefixing can also be applied to ANI. The gateway may choose to insert the unique 4-digit customer identifier ID in the ANI field based on mode that the operator has selected—e.g., prefixing DNIS, inserting ANI or both.

Outbound Traffic

The same tables that we have created for Domain identification and Domain configuration for inbound VOIP traffic can also be used for outbound VOIP traffic. These tables will serve as routing tables to direct the VOIP call to a specific gateway within a particular partner's network.

In the outbound call scenario, the gateways and gatekeepers make real time, dynamic routing decisions based on information provided in the incoming PSTN call—namely a DNIS prefixed with a unique 4-digit customer ID or a unique ANI. The gateways must then strip the prefix and make a routing decision based on both the Domain Configuration Table and the Domain Identification Table.

Figure 9:
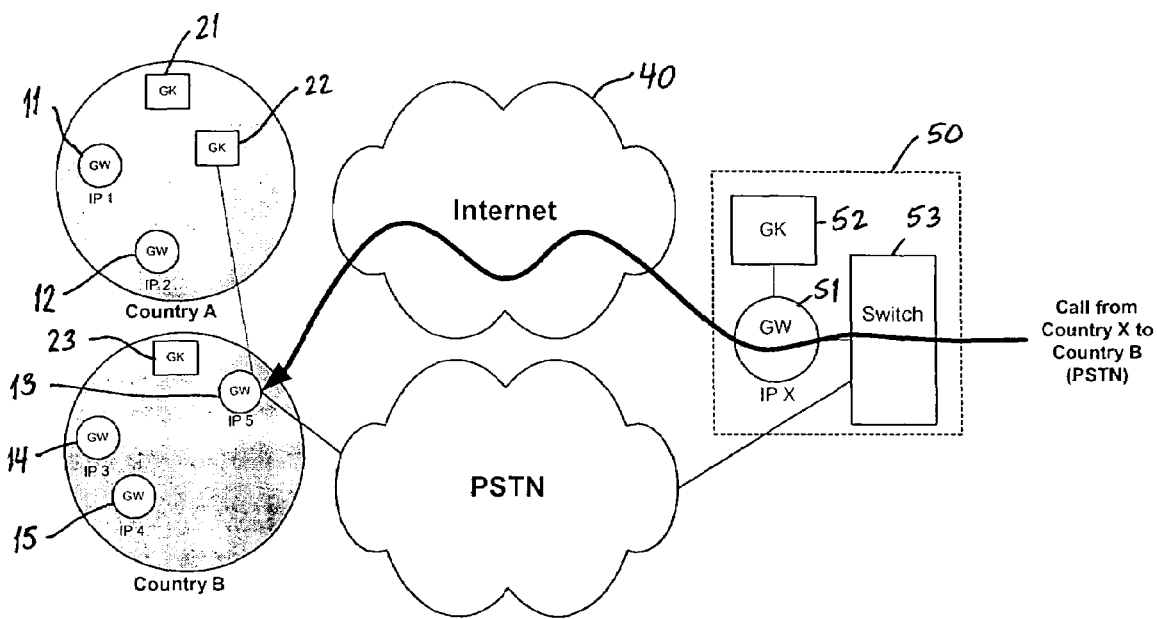
FIG. 9 diagrammatically illustrates the transmission of a call from a PSTN network through the platform and an Internet Protocol (IP) network.

The following example highlights the steps that should occur for the VOIP platform to route any outgoing VOIP call according to the present invention. Assume that a partner in country X wants to place a call to a partner in country B. When the switch 53 of the platform 50 receives the PSTN call, the switch 53 decides to route the call via VOIP—based on price, quality, Access Service Request (ASR), etc. (See FIG. 9).

Figure 10:
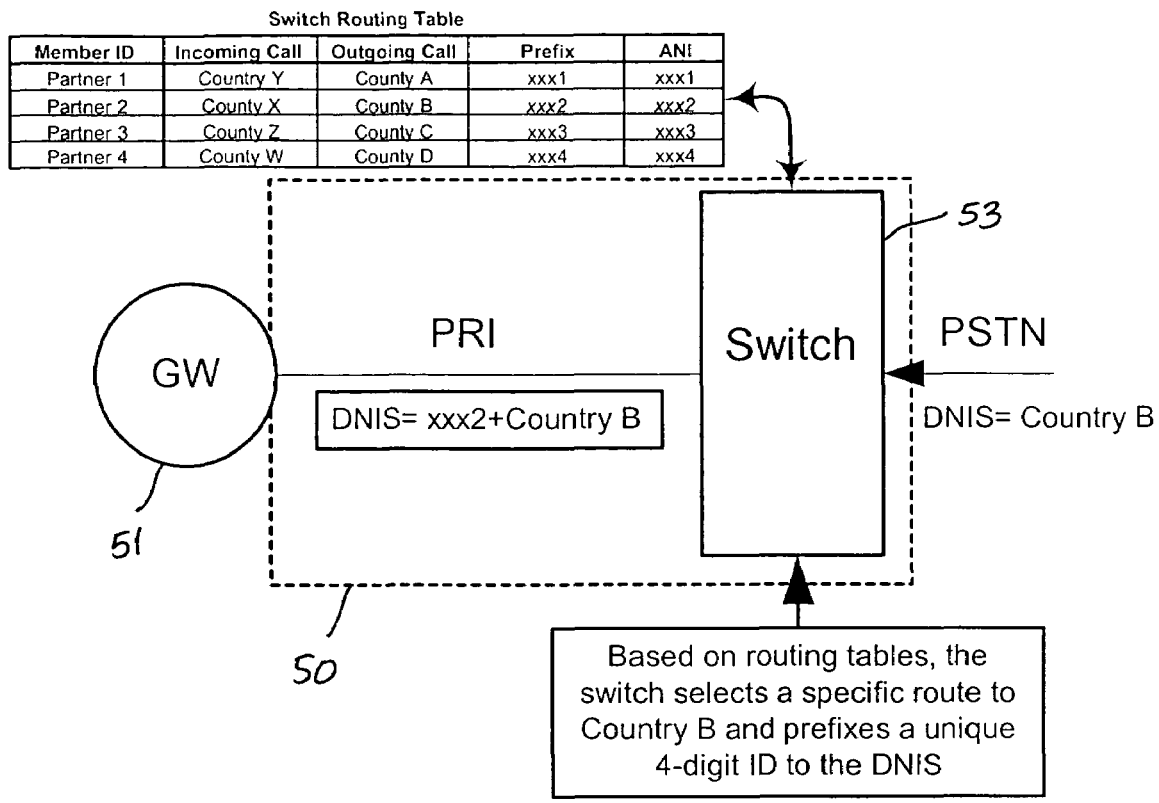
FIG. 10 diagrammatically illustrates the pre-fixing of a unique identifier to the Dialed Number Identification Service (DNIS)

Once the switch 53 has made the decision that the call must be sent to a VOIP route, the switch 53 searches the internal routing tables of the platform 50 and prefixes a unique 4-digit customer identification ID to the DNIS or inserts the unique ID in the ANI field (see FIG. 10).

Figure 11:
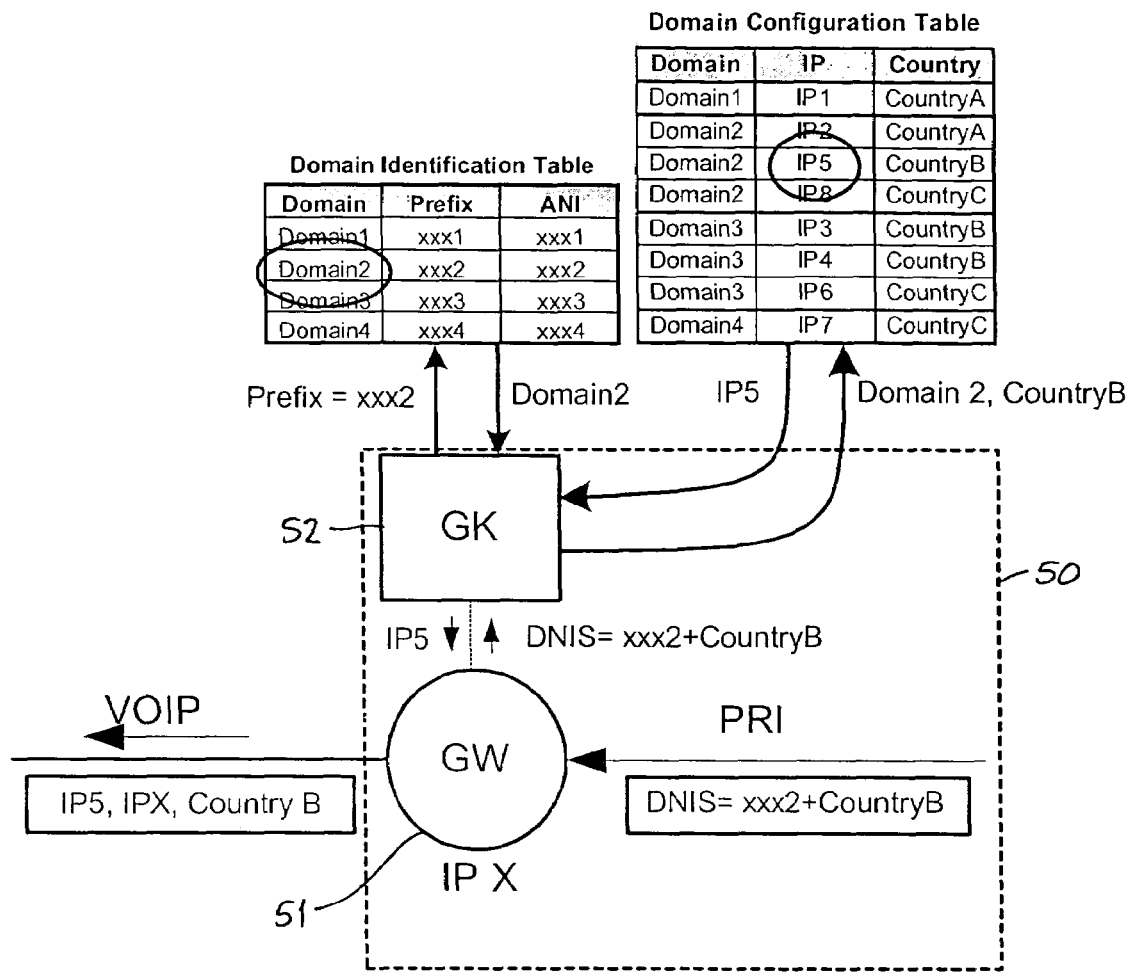
FIG. 11 diagrammatically illustrates how the platform retrieves routing information from the look-up tables.

Once the gateway 51 receives the PSTN call, the gateway 51 queries the gatekeeper 52 for routing and authorization information and sends the prefixed DNIS to the gatekeeper 52. The gatekeeper 52 strips the 4-digit prefix, determines which domain 31-34 and gateway 11-18 the call should be routed to and replies with the partner's gateway's IP (IP5 in this example) to the querying gateway 51 (see FIG. 11).

The gatekeeper 52 must also request authorization from the partner's network to route a call to the gateway 13 serving Country B.

Figure 12:
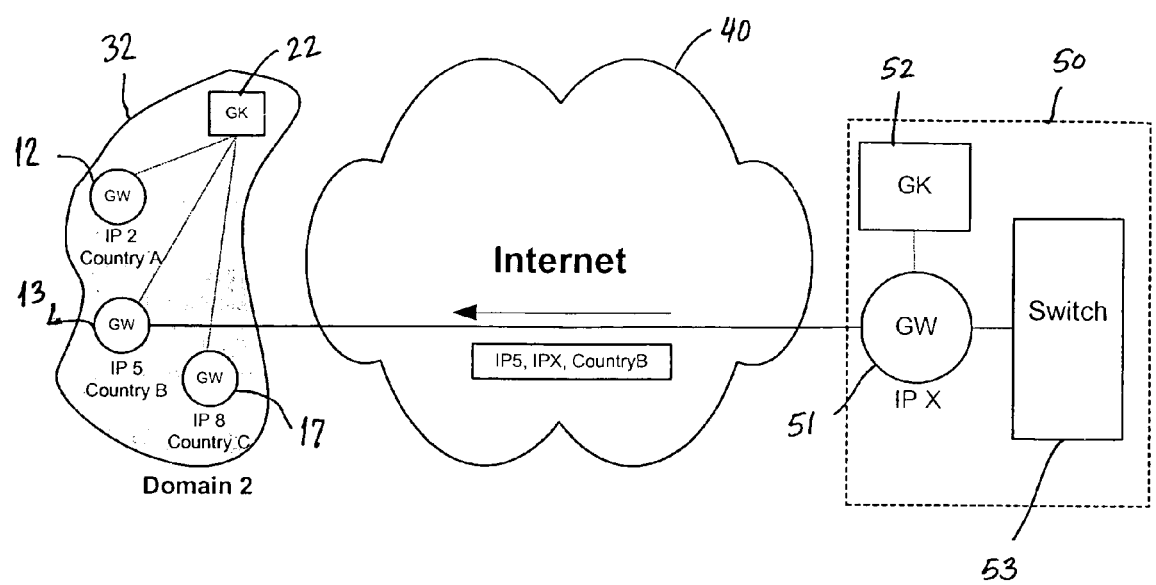
FIG. 12 diagrammatically illustrates the transmission of a VOIP call from the platform through an IP network.

Finally, the gateway 51 launches a VOIP call to the destination gateway 13 in our partner's network serving country B (see FIG. 12).

Note that the concept of DNIS prefixing may also be applied to ANI. The platform's gateway 51 and gatekeeper 52 may need to look at the ANI for proper route selection based on the mode that the operator has selected.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method of transmitting telecommunications traffic between packet-switched networks and circuit-switched networks, comprising steps of:
   a. assigning an identifier to a packet-switched network;
   b. receiving, by a network switch, telecommunications traffic from a circuit-switched network;
   c. selecting, by the network switch using a switch routing table, a packet-switched network for receiving the telecommunications traffic;
   d. associating, by the network switch, the telecommunications traffic with the assigned identifier;
   e. receiving, by a VoIP platform, the telecommunications traffic with the assigned identifier;
   f. retrieving, by the VoIP platform from a VoIP platform routing table that utilizes the assigned identifier, destination IP information for the selected packet-switched network;
   g. converting, by the VoIP platform, the telecommunications traffic into a format compatible with the selected packet-switched network; and
   h. transmitting, by the VoIP platform, the converted telecommunications traffic to the selected packet-switched network.

2. The method of claim 1, wherein step d further comprises the network switch prefixing the assigned identifier to a Dialed Number Identification Service for a call in the telecommunications traffic.

3. The method of claim 1, wherein step d further comprises the network switch prefixing the assigned identifier to an Automatic Number Identifier for a call in the telecommunications traffic.

4. The method of claim 2, further comprising stripping the assigned identifier prior to the transmitting step.

5. The method of claim 3, further comprising stripping the assigned identifier prior to the transmitting step.

6. The method of claim 1, wherein the destination IP information for the selected packet-switched network comprises an IP address for a gateway in the selected packet-switched network.

7. A method of transmitting telecommunications traffic between packet-switched networks and circuit-switched networks, comprising steps of:
   a. assigning an identifier to a packet-switched network;
   b. receiving, by a VoIP platform, telecommunications traffic from a packet-switched network and originating IP information for the packet-switched network;
   c. retrieving, by the VoIP platform from a VoIP platform routing table that utilizes the originating IP information, the assigned identifier;
   d. associating, by the VoIP platform, the telecommunications traffic with the assigned identifier;
   e. converting, by the VoIP platform, the telecommunications traffic into a format compatible with a circuit-switched network;
   f. selecting, by a network switch using a switch routing table that utilizes the assigned identifier, a circuit-switched network for receiving the convened telecommunications traffic; and
   g. transmitting, by the network switch, the convened telecommunications traffic to the selected circuit-switched network.

8. The method of claim 7, wherein step d further comprises the VoIP platform prefixing the assigned identifier to a Dialed Number Identification Service for a call in the telecommunications traffic.

9. The method of claim 7, wherein step d further comprises the VoIP platform prefixing the assigned identifier to an Automatic Number Identifier for a call in the telecommunications traffic.

10. The method of claim 8, further comprising stripping the assigned identifier prior to the transmitting step.

11. The method of claim 9, further comprising stripping the assigned identifier prior to the transmitting step.

12. The method of claim 7, wherein the originating IP information comprises an IP address for a gateway in the packet-switched network.

13. A system configured to transmit telecommunications traffic between packet-switched networks and circuit-switched networks, comprising:
- a network switch connected to a circuit-switched network;
- a switch routing table relating the circuit-switched network to a packet-switched network through an identifier wherein the identifier is assigned to the packet-switched network;
- the network switch configured to select, through the switch routing table, the packet-switched network to receive telecommunications traffic from the circuit-switched network and configured to associate the telecommunications traffic from the circuit-switched network with the identifier;
- a VoIP platform connected to the network switch and to the packet-switched network,
- the VoIP platform comprising a VoIP platform routing table relating the identifier to destination IP information for the packet-switched network, and
- the VoIP platform configured to receive the telecommunications traffic and the identifier, configured to use the identifier to retrieve from the VoIP platform routing table the destination IP information for the packet-switched network, configured to convert the telecommunications traffic into a format compatible with the packet-switched network and configured to transmit the converted telecommunications traffic to the packet-switched network.

14. The system of claim 13, wherein the network switch is configured to prefix the identifier to a Dialed Number Identification Service for a call in the telecommunications traffic.

15. The system of claim 13, wherein the network switch is configured to prefix the identifier to an Automatic Number Identifier for a call in the telecommunications traffic.

16. A system configured to transmit telecommunications traffic between packet-switched networks and circuit-switched networks, comprising:
- a VoIP platform connected to a packet-switched network,
- the VoIP platform comprising a VoIP platform routing table relating originating IP information for the packet-switched network to an identifier wherein the identifier is assigned to the packet-switched network;
- the VoIP platform configured to use the originating IP information to retrieve from the VoIP platform routing table the identifier corresponding to the packet-switched network, configured to associate the telecommunications traffic with the identifier and configured to convert the telecommunications traffic into a format compatible with a circuit-switched network;
- a network switch connected to the VoIP platform and to the circuit-switched network; and
- a switch routing table that utilizes the identifier to relate the packet-switched network to the circuit-switched network,
- the network switch configured to select, through the switch routing table that utilizes the identifier, the circuit-switched network to receive the telecommunications traffic.

17. The system of claim 2, wherein the VoIP platform is configured to prefix the identifier to a Dialed Number Identification Service for a call in the telecommunications traffic.

18. The system of claim 2, wherein the VoIP platform is configured to prefix the identifier to an Automatic Number Identifier for a call in the telecommunications traffic.

\* \* \* \* \*